| United States Patent [19] | [11] Patent Number: 4,837,040 |
| Yokoyama et al. | [45] Date of Patent: Jun. 6, 1989 |

[54] CHEESE AND YAM PRODUCT

[75] Inventors: Hitoshi Yokoyama, Sennan; Noriko Mukai, Izumi, both of Japan

[73] Assignee: Fuji Oili Company, Limited, Osaka, Japan

[21] Appl. No.: 58,883

[22] Filed: Jun. 5, 1987

[30] Foreign Application Priority Data

Jun. 12, 1986 [JP] Japan ................................. 61-137347

[51] Int. Cl.$^4$ ....................... A23C 20/00; A23L 1/214
[52] U.S. Cl. .................................... 426/582; 426/637
[58] Field of Search ............................. 426/637, 582,

[56] References Cited

U.S. PATENT DOCUMENTS 4,695,475  9/1987  Zwiercan ............................ 426/582

FOREIGN PATENT DOCUMENTS

| 0071114 | 2/1983 | European Pat. Off. ............ 426/637 |
| 2537403 | 6/1984 | France ................................. 426/582 |
| 0155782 | 9/1985 | Japan ................................... 426/637 |
| 2127270 | 4/1984 | United Kingdom ................ 426/637 |

OTHER PUBLICATIONS

Bender, A. Dictionary of Nutrition and Food Technology, 2nd Ed., Washington Butterworths, 1965, p. 215.

*Primary Examiner*—Donald E. Czaja
*Assistant Examiner*—Helen Pratt
*Attorney, Agent, or Firm*—Wenderoth, Lind & Ponack

[57] ABSTRACT

A cheese product having properties similar to those of heated mozzarella type cheese at room temperature which comprises a cheese ingredient and a mucous material of a yam.

7 Claims, No Drawings

CHEESE AND YAM PRODUCT

FIELD OF THE INVENTION

The present invention relates to cheese. More particularly, it relates to novel cheese product the properties in a water-containing state at room temperature of which is similar to those of heated mozzarella type cheese.

BACKGROUND OF THE INVENTION

Nowadays, cheeses are useful for food per se as well as they are used in various food as raw materials.

However, since cheeses are usually in solid at room temperature, many difficulties are encountered in mechanical treatments thereof. For example, in the case of using cheese as a raw material for food, a quantitative operation such as quantitative supply or distribution thereof on dough, crust and the like is often required, but it is very difficult to carry out such an operation mechanically.

When cheese is processed in the form of sheet, shred, dice, powder and the like, these difficulties can be somewhat eliminated. However, in many cases, manual operation is still required to properly distribute cheese on dough, crust and the like. Even if proper distribution can be obtained without manual operation, there are other problems. For example, cheese is spilt from dough, crust and the like during movement to a heating zone, which results in low yield and impairment of environmental sanitation. Further, in many cases, melting by heating is necessary for mechanical treatments such as mixing, kneading and the like.

On the other hand, mozzarella type cheese decreases in shape retention to form sol upon heating and shows high stretching properties upon pulling. Such properties are preferred in view of taste and are useful for raw materials of food. However, since mozzarella type cheese is also in solid at a temperature of 40° C. or lower, food products utilizing mozzarella type cheese has such a defect that taste of the products is remarkably spoiled with the elapse of time after cooking. Further, mozzarella type cheese is limited to use in food products to be cooked and can not be utilized in ice cream.

OBJECTS OF THE INVENTION

If it is possible to obtain cheese the properties at room temperature of which is similar to those of heated mozzarella type cheese, spoilage of taste of food products using such cheese can be prevented even with the elapse of time after cooking, and use of mozzarella type cheese in food products other than those to be cooked can be broadly developed. Further, if it is possible to provide plasticity or fluidity to cheese at room temperature or a little bit higher temperature, it facilitates mechanical operation in production of food utilizing such cheese. In view of these conception, the present inventors have studied intensively to obtain such cheese.

The main object of the present invention is to provide cheese having plasticity or fluidity at room temperature or a little bit higher temperature which can be used as food per se or as raw materials for various food products including ice cream.

SUMMARY OF THE INVENTION

According to the present invention, there is provided a novel cheese product comprising a cheese ingredient and a mucous material of a yam.

The term "mucous material of a yam" used herein means a minced, grated or ground material of a tuber of a yam belonging to Dioscorea, a dried and pulverized material of the tuber or a reconstituted material of the dried and pulverized material.

The properties of the novel cheese product of the present invention in a water-containing state at room temperature or lower is similar to those of heated mozzarella type cheese and the product has good workability in mechanical operation such as in operation of a depositor. Further, cheese product of the present invention can be in a dried form which is readily reconstituted with water upon consumption.

DETAILED DESCRIPTION OF THE INVENTION

The cheese ingredient used in the present invention is not limited to a specific one and any cheese or imitation cheese can be used. Examples thereof include so-called natural type cheeses produced from milk protein and milk fats such as cottage cheese, cream cheese, Chedder cheese, Gouda cheese, Edam cheese, Emmentaler cheese, Swiss cheese, Provolone cheese, Limburger cheese, Camembert cheese, Roquefort cheese, blue cheese and process cheeses: so-called filled type cheeses produced by replacing a part or all of milk fats with those derived from other than milk such as vegetable fats and oils, fractionated, hardened and/or interesterified products thereof and the like: and so-called imitation type cheeses produced by replacing a part or all of both milk protein and milk fats with those derived from other than milk such as soybean protein and the above-described vegetable fats and oils and their processed materials. These cheeses can be used alone or in combination thereof.

The mucous material of a yam used in the present invention is prepared by mincing, grating or grinding tuber of a yam belonging to Dioscorea such as *Dioscorea japonica, Dioscorea batatas,* and the like. Optionally, the mucous material may contain a relatively small amount (e.g., 1 to 50 parts by weight per 100 parts by weight of the mucous material) of a known modifier such as a sugar alcohol, protein (e.g., egg white, casein, etc.), a thickener (e.g., sodium alginate, potassium alginate, guar gum, alginic acid, tamarind seeds gum, locust bean gum, gum arabic, etc.), a saccharide (e.g., maltose, sucrose, lactose, glucose, xylose, etc.), a surfactant, etc. The mucous material may be a dried material thereof (prepared by a conventional drying technique such as sun-drying, film drying, hot air drying or lyophilization and then pulverizing) or its reconstituted material with water.

The cheese product of the present invention can be produced by mixing cheese with the mucous material of a yam according to a conventional blending or mixing technique, or by adding the mucous material of a yam to cheese at an appropriate stage during cheese production.

The suitable amount of the mucous material to be added to the cheese product of the present invention somewhat varies depending upon the water content of the cheese product at the time of consumption. That is, in order to provide properties similar to those of heated mozzarella type cheese at room temperature or lower, it is necessary that the cheese product of the present invention is hydrated at the time of consumption. The water content of such hydrated product is usually not less than 15 to 20% by weight. In such a range of the water content of the product, when the water content is lower, the amount of the mucous material becomes lower.

In general, it is necessary that the mucous material of a yam is contains in an amount of 0.5% by weight, preferably, 1% by weight as the solids concentration thereof based on the total weight of the solid matter of the cheese product. The amount of the mucous material is too small, it is difficult to provide properties similar to those of heated mozzarella type cheese at room temperature or lower. As the amount of the mucous material is increased, stretching properties of the product is increase and the product has stretching properties compared to or more than those of mozzarella type cheese. However, when the amount of the mucous material is too large, taste of cheese is impaired and peculiar odor is produced. Accordingly, the amount of the mucous material is not more than 50% by weight, preferably, not more than 25% by weight as the solids concentration thereof based on the total weight of the solid matter of the cheese product. As far as the amount of the mucous material is proper, flavor of cheese is rather enhanced and rather improved. This may be resulted from change of behavior of flavor ingredients in cheese against water.

By the way, the cheese product of the present invention is not necessarily a water-containing product and it may be a dried product which is reconstituted, for example, with water or warm water at the time of consumption. Further, the product is not necessarily a shaped product. It may be in the form of powder from which a paste cheese having properties similar to heated mozzarella type cheese at room temperature or lower can be prepared by mixing it with water and it is useful as a so-called instant cheese product.

The following Examples further illustrate the present invention in detail but is not to be construed to limit the scope thereof. In the Examples, all "parts" and "%'s" are by weight unless otherwise stated.

EXAMPLE 1

A cheese product was prepared by mixing commercially available natural cream cheese (solids content: 45%) (90 parts), grated yam tuber (solids content: 30%) (10 parts) and a small amount of $\beta$-carotene and flavor at 70° C. and cooling to 5° C. in a refrigerator.

The cheese product was taken out of the refrigerator and applied to a depositor without any heating. The cheese product could be squeezed out from the depositor on dough to form even layer thereon. When the dough was baked in an oven, the cheese product part of the resulting bread had appearance and mouth feel similar to those of mozzarella type cheese and, after allowing to cool, mouth feel of that part was softer than that of mozzarella type cheese.

In comparison, the same procedure was repeated to prepare a cheese produce except that the grated yam tuber was not added. The resulting product could not be squeezed out from the depositor unless it was heated to about 60° C., and required manual spreading operation to form a layer on dough even when it was squeezed out at about 60° C.

EXAMPLE 2

A cheese product was prepared by mixing commercially available filled type cream cheese (manufactured and sold by Fuji Oil K.K., Japan under the trade name of "Quval Dio", solids content: 45%) (90 parts), commercially available powdered yam tuber (manufactured and sold by Senba Toka Kogyo K.K., Japan under the trade name of "Yamaimo Toku A": solids content: 95%) (10 parts) and a small amount of $\beta$-carotene and flavor at 70° C. and cooling to 5° C. in a refrigerator.

The cheese product was taken out of the refrigerator and applied to a depositor without any heating. The cheese product could be squeezed out from the depositor on pizza crust. When the crust was baked in an oven, the cheese product part of the resulting pizza had appearance similar to that of mozzarella type cheese and, after allowing to cool, that part had high stretching properties.

EXAMPLE 3

A powdered cheese product was prepared by mixing commercially available natural cheese powder (manufactured and sold by Hoko Suisan K.K., Japan under the trade name of "Rolf Powder PP100"; solids content: 95%) (90 parts) and commercially available powdered yam tuber (the above "Yamaimo Toku A") (10 parts).

After storage for three months at room temperature, water (150 parts) was admixed with the powdered product (100 parts) to obtain a paste product. Likewise, water (150 parts) was admixed with the above commercially available natural cheese powder (100 parts) to obtain another paste product. When the former paste was spooned with a spatula at room temperature, it showed high stretching properties similar to those of heated mozzarella type cheese. On the other hand, the latter paste did not show stretching properties.

EXAMPLE 4

A powdered cheese product was prepared by mixing commercially available imitation cheese powder (manufactured and sold by Fuji Oil K.K., Japan under the trade name of "Quval Powder V": solids content: 95%) and commercially available powdered yam tuber (the above "Yamaimo Toku A") in the weight ratio of 90:10 or 98:2.

Water (100 parts or 25 parts) was admixed with each powdered product (100 parts) to obtain a paste product. Stretch properties of each paste was observed by spooning the paste with a spatula at room temperature. Each paste showed high stretching properties similar to those of heated mozzarella type cheese but, when the amount of the powdered yam tuber was smaller or the amount of water added was smaller, stretch properties became higher.

EXAMPLE 5

A cheese product was prepared by mixing commercially available Chedder cheese (solids content: 60%) (70 parts), commercially available powdered yam tuber (the above "Yamaimo Toku A") (10 parts), water (30 parts) and a small amount of a polyphosphate at 70° C., filling in a plastic container and cooling it.

The cheese product thus obtained was directly squeezed out on dough. When the dough was baked in an oven and allowed to cool to room temperature, the cheese product part of the resulting bread showed high stretching properties similar to that of mozzarella type cheese.

EXAMPLE 6

An oil phase consisting of rapeseed hardened oil (melting point: 31.2° C.) (10 parts), lecithin (0.5 part) and a small amount of flavor and colorant was added to a water phase consisting of water (82 parts) and skimmed milk powder (8 parts). The mixture was pre-emulsified and homogenized at 65° C., pasteurized at 90° C. for 2 minutes and quickly cooled to obtain a cream mix.

A lactic acid bacteria bulk starter (0.5 part), a small amount of rennet and a small amount of calcium chloride were added to the above-obtained cream mix (100 parts) and the mixture was fermented at 20° C. for 16 hours. The fermented mixture became pH 4.7.

The fermented mixture was pasteurized at 80° C. for 30 minutes and whey was drained to obtain curd containing 65% of water. To the curd were added locust bean gum (0.23%), salt (0.6%) and a small amount of flavor and the mixture was stirred at the rate of 350 rpm and the temperature of 70° C. for 3 minutes and then kneaded. During kneading, the above commercially available powdered yam tuber (3%) was added. The mixture was homogenized under pressure of 100 kg/cm$^2$ and cooled to 5° C. to obtain a cheese product.

The cheese product showed properties similar to those of mozzarella type cheese at room temperature. On the other hand, a similar product which did not contain the powdered yam tuber did not show such properties.

What is claimed is:

1. A cheese product comprising a cheese ingredient and a mucous material of a yam.

2. A cheese product according to claim 1, wherein the product contains the mucous material of a yam in an amount of 0.5 to 50% by weight as the solids concentration thereof based on the total weight of the solid matter of the cheese product.

3. A cheese product according to claim 1, wherein the mucous material of a yam is that prepared by mincing, grating or grinding the tuber of a yam belonging to Dioscorea, or a dried material thereof.

4. A cheese product comprising a cheese ingredient and mucous yam material or a dried material thereof in an amount of 0.5 to 50% by weight as the solids concentration thereof based on the total weight of the solid matter of the cheese product, said mucous yam material being prepared by mincing, grating or grinding the tuber of a yam belonging to Dioscorea or a dried material thereof.

5. A cheese product according to claim 4 in which the cheese product is selected from the group consisting of cottage cheese, cream cheese, cheddar cheese, Gouda cheese, Edam cheese, Emmantaler cheese, Swiss cheese, Provolone cheese, Limburger cheese, Camembert cheese, Roquefort cheese and blue cheese.

6. A cheese product according to claim 4 in which the cheese product is selected from filled cheeses produced by replacing a part or all of the milk fats in the cheese with vegetable fats and oils and fractionated, hardened and interesterified products thereof and imitation cheeses produced by replacing all or part of both milk proteins and milk fats in the cheese with soybean protein, vegetable oils and fats and fractionated, hardened and interesterified products thereof.

7. A cheese produced according to claim 4 in which the tuber of a yam belonging to Dioscorea is selected from the group consisting of *Dioscorea japonica* and *Dioscorea batatas*.

* * * * *